United States Patent
Benhimane et al.

(10) Patent No.: US 9,830,715 B2
(45) Date of Patent: Nov. 28, 2017

(54) METHOD FOR DETERMINING A PARAMETER SET DESIGNED FOR DETERMINING THE POSE OF A CAMERA AND/OR FOR DETERMINING A THREE-DIMENSIONAL STRUCTURE OF THE AT LEAST ONE REAL OBJECT

(71) Applicant: Apple Inc., Cupertino, CA (US)

(72) Inventors: Selim Benhimane, Munich (DE); Sebastian Lieberknecht, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/961,557

(22) Filed: Dec. 7, 2015

(65) Prior Publication Data

US 2016/0321811 A1 Nov. 3, 2016

Related U.S. Application Data

(63) Continuation of application No. 13/996,408, filed as application No. PCT/EP2010/007831 on Dec. 21, 2010, now Pat. No. 9,208,563.

(51) Int. Cl.
*G06T 7/00* (2017.01)
*G06T 7/70* (2017.01)
(Continued)

(52) U.S. Cl.
CPC .............. *G06T 7/70* (2017.01); *G06T 7/251* (2017.01); *G06T 7/579* (2017.01); *G06T 7/75* (2017.01); *G06T 2207/30244* (2013.01)

(58) Field of Classification Search
CPC .. G06T 7/70; G06T 7/579; G06T 7/75; G06T 7/251; G06T 2207/30244

(Continued)

(56) References Cited

U.S. PATENT DOCUMENTS 7,023,536 B2 4/2006 Zhang
7,038,846 B2 5/2006 Mandella
(Continued)

FOREIGN PATENT DOCUMENTS

CN 1737810 A 2/2006
CN 1989526 A 6/2007
CN 101311964 A 11/2008

OTHER PUBLICATIONS

Agrawal, Amit K., and Rama Chellappa. "Robust ego-motion estimation and 3D model refinement using depth based parallax model." Image Processing, 2004. ICIP'04. 2004 International Conference on. vol. 4. IEEE, 2004.*

(Continued)

*Primary Examiner* — Amandeep Saini
(74) *Attorney, Agent, or Firm* — Blank Rome LLP (57) ABSTRACT

The specification relates to determining either or both of the pose of a camera with respect to a real object or a three dimensional structure of the real object. In some of the described embodiments, a captured image including the real object is analyzed with respect to a reference image that also includes the real object. A parameter set is estimated by using a homography between the reference image and the captured image. An update to the parameter set is made by using an iterative minimization process that includes comparing a first set of pixels in the reference image with a computed set of pixels in the captured image, where the computed set of pixels used for comparison varies in different iterations of the iterative minimization process.

20 Claims, 8 Drawing Sheets

(51) Int. Cl.
*G06T 7/73* (2017.01)
*G06T 7/579* (2017.01)
*G06T 7/246* (2017.01)

(58) Field of Classification Search
USPC .......................................................... 382/103
See application file for complete search history.

(56) References Cited

U.S. PATENT DOCUMENTS

| | | |
|---|---|---|
| 7,088,440 B2 | 8/2006 | Buermann |
| 7,110,100 B2 | 9/2006 | Buermann |
| 7,113,270 B2 | 9/2006 | Buermann |
| 7,161,664 B2 | 1/2007 | Buermann |
| 7,203,384 B2 | 4/2007 | Carl |
| 7,268,956 B2 | 9/2007 | Mandella |
| 7,474,809 B2 | 1/2009 | Carl |
| 7,729,515 B2 | 6/2010 | Mandella |
| 7,826,641 B2 | 11/2010 | Mandella |
| 7,961,909 B2 | 6/2011 | Mandella |
| 2005/0168437 A1 | 8/2005 | Carl |
| 2010/0188503 A1 | 7/2010 | Tsai |
| 2011/0227915 A1 | 9/2011 | Mandella |
| 2012/0038549 A1 | 2/2012 | Mandella |
| 2013/0194418 A1 | 8/2013 | Gonzalez-Banos |

OTHER PUBLICATIONS

Benhimane et al., "Integration of Euclidean Constraints in Template Based Visual Tracking of Piecewise-Planar Scenes," Intelligent Robots and Systems, Oct. 1, 2006, pp. 1218-1223.
Davison et al., "MonoSLAM: Real-time single camera SLAM." Pattern Analysis and Machine Intelligence, IEEE Transactions on 29.6 (2007): 1052-1067.
Irani et al., "Vision Algorithms '99, All About Direct Methods," Springer-Verlag Berlin Heidelberg, 2000, pp. 267-277.
Klein et al., "Parallel Tracking and Mapping for Small AR Workspaces," ISMAR, 2007.
Newcombe et al., "Live Dense Reconstruction with a Single Moving Camera CVPR," 2010.
Pilet et al., "Fast Non-Rigid Surface Detection, Registration and Realistic Augmentation," IJCV, 76(2): pp. 109-112, 2007.
Silveira et al., "Unified Direct Visual Tracking of Rigid and Deformable Surfaces under Generic Illumination Changes in Grayscale and Color Images," International Journal of Computer Vision, vol. 89, No. 1, pp. 84-105, Feb. 2010.

* cited by examiner

METHOD FOR DETERMINING A PARAMETER SET DESIGNED FOR DETERMINING THE POSE OF A CAMERA AND/OR FOR DETERMINING A THREE-DIMENSIONAL STRUCTURE OF THE AT LEAST ONE REAL OBJECT

This application is entitled to the benefit of, and incorporates by reference essential subject matter disclosed in PCT Application No. PCT/EP2010/007831 filed on Dec. 21, 2010.

BACKGROUND OF THE INVENTION

1. Technical Field

The present invention is related to a method for determining a parameter set which is designed to be used for determining the pose of a camera with regard to at least one real object captured by the camera and/or for determining a three-dimensional structure of the at least one real object.

2. Background Information

Many applications in the field of computer vision require aligning two images with subpixel precision, such as described in Irani, M. & Anandan, P. Vision Algorithms '99, All about direct methods, Springer-Verlag Berlin Heidelberg, 2000, 267-277 ([1]), for example image mosaicing and super resolution, it naturally may also serve as basis for augmented reality applications. While there exists a whole body of literature on planar template tracking as well as sequential structure from motion, there is known to be only one method, such as described in Silveira, G. & Malis, E. Unified direct visual tracking of rigid and deformable surfaces under generic illumination changes in grayscale and color images IJCV, 2010, 89, 84-105 ([2]), that also recovers the shape of the object depicted in the reference image simultaneously to the estimation of the relative camera motion. This will be explained in more detail below.

In the field of monocular deformable template tracking, a variety of methods exist. There are direct and indirect methods, the former class working exclusively on intensity values while the latter are also using abstractions such as feature points or lines. Feature points have the advantage that they can establish correspondences also in presence of relatively large baselines, while the computational cost of computing these correspondences is high given no (offline) training phase. Direct methods however rely on relatively small baselines, but are very precise due to using all available information.

J. Pilet, V. Lepetit, and P. Fua. Fast non-rigid surface detection, registration and realistic augmentation. IJCV, 76(2):109-112, 2007 ([7]) use a coarse point-based detection method to obtain the approximate registration. After that they refine by deforming a triangular mesh in image space. Their method is robust to a high amount of outliers. However, it is designed to only work on single initially planar objects such as a piece of paper, also the optimization is carried out exclusively in image space.

Visual SLAM

In the area of visual SLAM (simultaneous localization and mapping), methods such as Davison, A. J., Reid, I. D. Molton, N. D. Stasse, O. MonoSLAM: Real-Time Single Camera SLAM PAMI, 2007, 26, 1052-1067 ([3]) or Klein, G. & Murray, D. Parallel Tracking and Mapping for Small AR Workspaces ISMAR, 2007 ([4]) model the environment as a point cloud based on salient feature points.

Furthermore, both methods described in [3] and [4] use a two-step approach to establish a matching between the model and the image: The points of the model are projected in the image; then the highest similarity measure is searched in a specified neighborhood of the projection and accepted as point-wise match. From these matches the pose of the camera is computed.

Also Newcombe, R. & Davison, A. Live dense reconstruction with a single moving camera CVPR, 2010 ([5]), though producing a dense model of the environment, inherently rely on feature points as they employ the method as described in [4] as basis for tracking and reconstruction.

Unified Direct Visual Tracking of Deformable Surfaces

In the deformable tracking algorithm of Silveira and Malis [2], based on an initial estimate, they iteratively compute an update to the parameters that encode the motion of the camera and the structure of the object depicted in the reference image. However, the optimization they propose works purely in 2D, i.e. in the image space. This implies that homographies are used (for the movement of the reference template) as black boxes during the optimization, i.e. there is no direct connection to 3D real-world entities. For the deformations of the surface, they use the notion of centers, i.e. selected 2d points on the template image for which the projective depth is estimated. They suggest two different strategies for interpolating the position of the centers to the full mesh, either bicubic interpolation or radial basis functions (RBF).

Despite good results, Silveira and Malis [2] base the optimization of parameters that have a direct meaning in image space only. Using the calibration of the camera, it is possible to use fewer parameters inside the minimization and also design a regularization function based on physical constraints.

It would therefore be beneficial to provide a method for determining a parameter set designed for determining the pose of a camera and/or for determining a three-dimensional structure of the at least one real object Which is applicable for real-time applications and is capable to work on objects with only little feature information and which is capable to simultaneously estimate the pose of a camera and reconstruct an object in the camera's view.

SUMMARY OF THE INVENTION

There is disclosed a method for determining a parameter set which is designed to be used for determining the pose of a camera with regard to at least one real object and/or for determining a three-dimensional structure of the at least one real object, comprising the steps of: providing a reference image including at least a part of the at least one real object, capturing at least one current image including at least a part of the at least one real object, providing an initial estimate of a parameter set, which is including at least the three-dimensional translation in the common coordinate system between the pose of the camera when capturing the reference image and the pose of the camera when capturing the current image, and the depth of at least a first point of the at least one real object in the common coordinate system, and determining an update of the estimate of the parameter set by means of an iterative minimization process, wherein in the iterative minimization process a first set of pixels in the reference image is compared with a computed set of pixels in the current image and the computed set of pixels in the current image varies at each iteration.

Particularly, the computed set of pixels herein varies depending on the depth of the at least first point of the at least one real object. The iteration can either be continued until a certain number of iterations is reached or the size of the updates falls below a defined threshold.

Thus, according to aspects of the invention, it is proposed to use a novel parameterization and regularization to simultaneously estimate the pose of a camera and reconstruct an object in the camera's view. Instead of relying on discriminative feature points like visual SLAM methods, the method particularly uses an iterative minimization process, wherein in the iterative minimization process a first set of pixels in the reference image is compared with a computed set of pixels in the current image and the computed set of pixels in the current image varies at each iteration. For example, so called dense tracking methods like [2] or intensity-based image registration methods like Lucas, B., Kanade, T.: An iterative image registration technique with an application to stereo vision. In Proceedings of the International Joint Conference on Artificial Intelligence, 1981, can be applied. Compared to existing dense tracking methods it does not introduce artificial smoothing on the structure, and by using real 3d world entities as parameters (instead of using pixels), the possibility to use physically plausible regularization is granted. In contrast to the described SLAM approach, the proposed method does not employ saliency for preprocessing the reconstruction and localization part, thus it is also able to work on objects that do not embody a sufficient amount of salient features. In contrast to the methods as described in [3] and [4], the proposed method solves simultaneously for the pixel-wise matches and the pose of the camera.

The initial estimate of the parameters within the parameter set describing the pose of the camera can be acquired using methods according to the state of the art, e.g. from structured light, optical feature tracking (e.g. marker-based tracking, SLAM, SURF, etc.), inertial sensor information and/or stereovision.

In the context of this invention, an inertial sensor may continuously provide internal sensor information including the position and/or orientation of an object or device with regard to the environment, by using any combination of the following: magnetometer (e.g. a compass), motion sensor/rotation sensor (accelerometers/gyroscopes), gravity sensor, and other sensors providing such information.

The initial estimate of the depth of the at least first point of the at least one real object can be provided, for example, as an assumption, by a Time-of-flight-camera, an environment model or any other method that allows the reconstruction of depth information in a scene.

The method can be used for determining the pose of a camera with regard to a real object in an optical tracking process and/or for reconstructing the three-dimensional model of the observed real object. The method is capable to fulfill real-time requirements of an augmented reality application. Since smoothness of the mesh is not enforced in the proposed method, tracking and reconstruction of objects that are either smooth or have little texture information, objects that have creases or sharp edges, or objects that are deformable becomes possible, also under varying light conditions.

The reconstructed model can, for example, be used as an occlusion model, for collision detection between virtual and real objects or for adjusting the distortion of movie textures according to the recognized deformation of a planar surface in augmented reality applications, or for computing the shading in a rendering process.

In other preferred embodiments the parameter set is further including the three-dimensional rotation in a common coordinate system between the pose of the camera when capturing the reference image and the pose of the camera when capturing the current image, and/or the vertical and horizontal focal lengths of the camera, and/or the coordinates of the principal point of the camera.

Advantageously, the three-dimensional structure of the at least one real object is parameterized in form of a piece-wise planar structure, e.g. in the form of triangles. For example, state-of-the-art methods for automatic meshing can be used. In a preferred embodiment, the density of the piece-wise planar structure is adaptively selected depending on the texture of regions of interests within the reference image.

By writing the normal of the piece-wise planar defined structure in a linear relationship with the inverse of the depths of three vertices of a triangle (face), a linearization of the depths in the parameter set is achieved. In this case, for the determining of the depth of the at least first point of the at least one real object an update of the inverse of the depth may be determined instead of an update of the depth.

In a preferred embodiment, in the iterative minimization process the update of the depth of the at least first point of the at least one real object is constrained by a regularization, in particular by considering a physical model. By imposing constraints on the optimization, unrealistic deformations of the determined three-dimensional structure of the at least one real object may be prevented.

Several regularization approaches may be used, e.g. the ones that are described below, but the method may also employ other means of regularization known to a person skilled in the art. For the regularization, temporal and/or spatial knowledge about the depth of the at least first point (vertex) can be considered.

In an embodiment the update of the depth or the inverse of the depth of the at least first point is only determined if the three-dimensional translation exceeds a certain threshold. This prevents outliers due to noise or other influences when very small translation is recorded.

In addition, the variance of the determined depth of the at least first point over time can be determined. This information can be used wherein the force of the regularization on this point is changed depending on the variance.

It is possible to constrain the update of the depth of the at least first point using the distance to a reference value of this point which is computed as an average of the previously determined depth values of this point (running average). This serves to smooth the determined three-dimensional structure.

It is also possible to regularize by using the distance to a reference value of this point which is computed as a weighted average of the previously determined depth values of this point. Photometric (intensity) or spatial information (distance from reference point) can be used as weights.

In a preferred embodiment, the optimization process is finalized for the whole three-dimensional structure at once. Particularly, the parameter set is including the depth of at least a second point of the at least one real object, and in the iterative minimization process, the update of the depth of the first point and of the at least second point is determined until a certain number of iterations has been reached or the variance of the update for the depth of the first point or the variance of the update of the depth for the at least second point falls below a defined threshold.

In another preferred embodiment, the optimization process is finalized for each vertex of the piece-wise planar structure independently, i.e. the parameter set is including the depth of at least a second point of the at least one real object, and in the iterative minimization process, the update of the depth of the first point is determined until the variance of the update of the depth of the first point falls below a defined threshold, and the update of the depth of the at least second point is determined until the variance of the update of the at least second point falls below a defined threshold.

BRIEF DESCRIPTION OF THE DRAWINGS

The invention will now be explained with reference to the following description of exemplary embodiments together with accompanying drawings, in which.

DETAILED DESCRIPTION OF THE INVENTION

Figure 8:
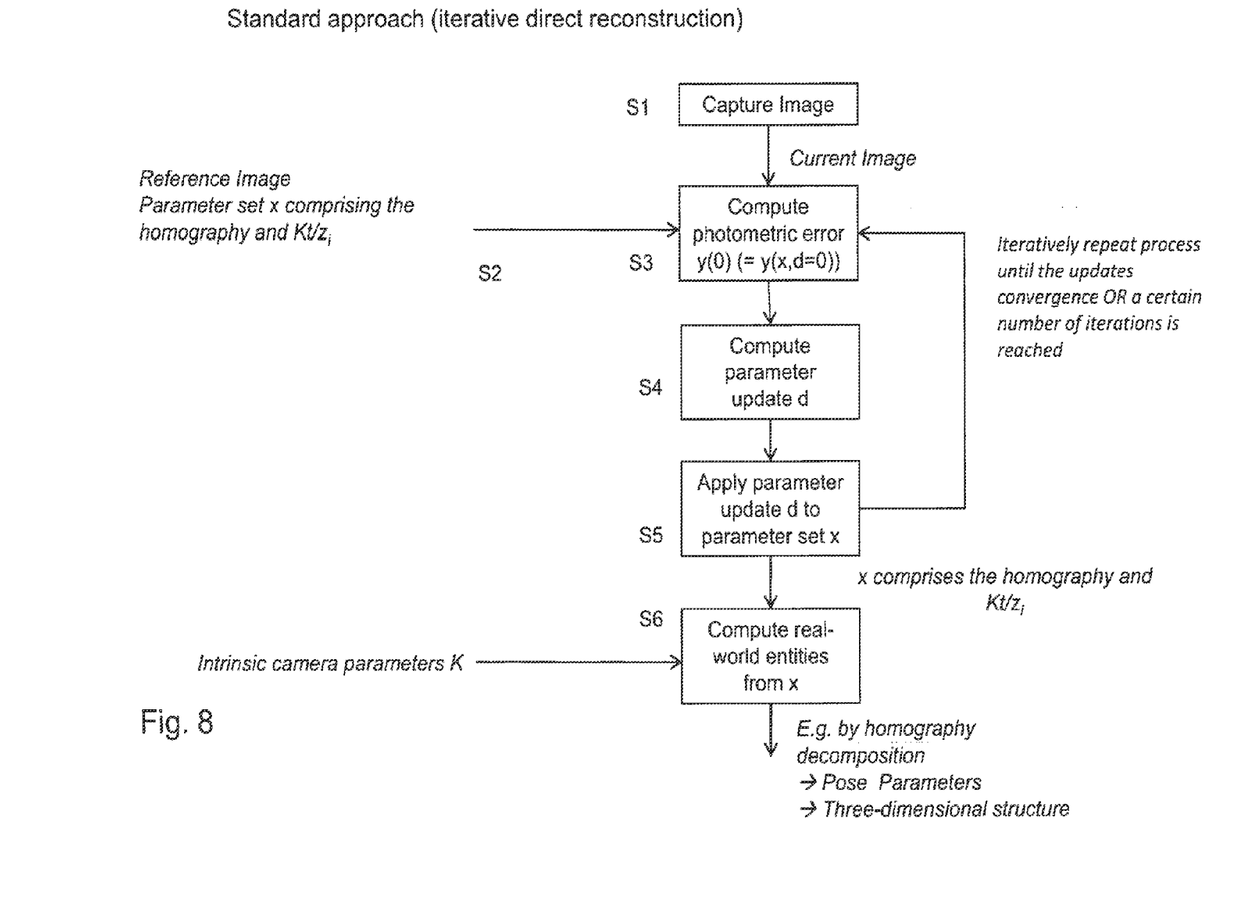
FIG. 8 shows a flow diagram of a standard approach of a known tracking algorithm.

In FIG. 8, a standard approach is illustrated according to the principles as disclosed in [2] as mentioned above, describing a tracking algorithm performing iterative direct reconstruction based on an initial estimate of a parameter set x comprising the homography between a reference image and a current image taken by the camera. Particularly, an update to the parameters that encode the motion of the camera and the structure of the object depicted in the reference image is iteratively computed, with the optimization working purely in 2D, i.e. in the image space.

According to step S1, a current image is captured by a camera wherein the pose of the camera shall be determined in the following process. To this end, in step S2 a reference image is provided together with an initial estimate of a parameter set x comprising the homography between the current image and the reference image and $Kt/z_i$ with K comprising an estimate of the matrix of intrinsic camera parameters, t being a vector indicative of a translation value, and $z_i$ being the depth of point i with respect to the camera coordinate system. In step S3, the photometric error y is computed using the data of the current image and the reference image. According to step S4, a parameter update d of the parameter set x is computed from the photometric error y and applied to the parameter set x in step S5. The steps S3-S5 are iteratively repeated until the updates d convergence or a certain number of iterations is reached. Finally, in step S6 real-world entities may be computed from the latest version of the parameter set x, such as parameters of the camera pose and the three-dimensional structure of a real object depicted in the current image if the intrinsic camera parameters K are provided to perform a homography decomposition.

Figure 1A:
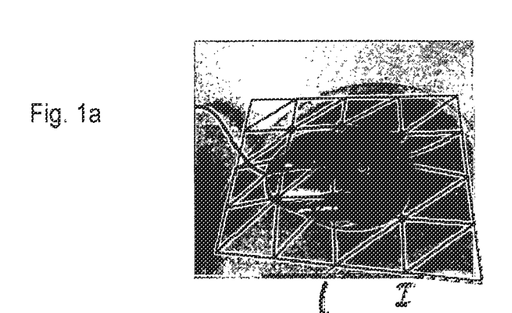
FIG. 1 shows an embodiment of the invention, wherein exemplary images of a real object are shown for describing an overview of an embodiment of a method according to the invention.

In the following, with reference to FIGS. 1 and 2, an embodiment of a method according to the invention will be described. In this regard, FIG. 1 shows exemplary images of a real object according to a reference image and a current image, whereas FIG. 2 shows a flow diagram of a method according to an embodiment of the invention.

According to step S11, a current image is captured by a camera including at least a part of a real object. For example, FIG. 1a depicts an image captured by a camera, wherein the pose of the camera shall be determined with respect to the real object, which is in the present case a computer mouse.

Figure 1B:
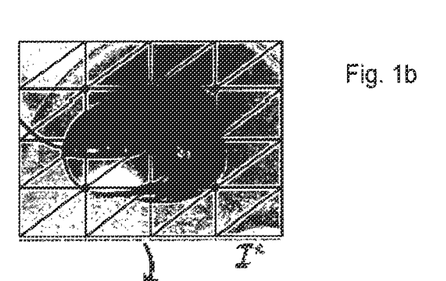
Figure 2:
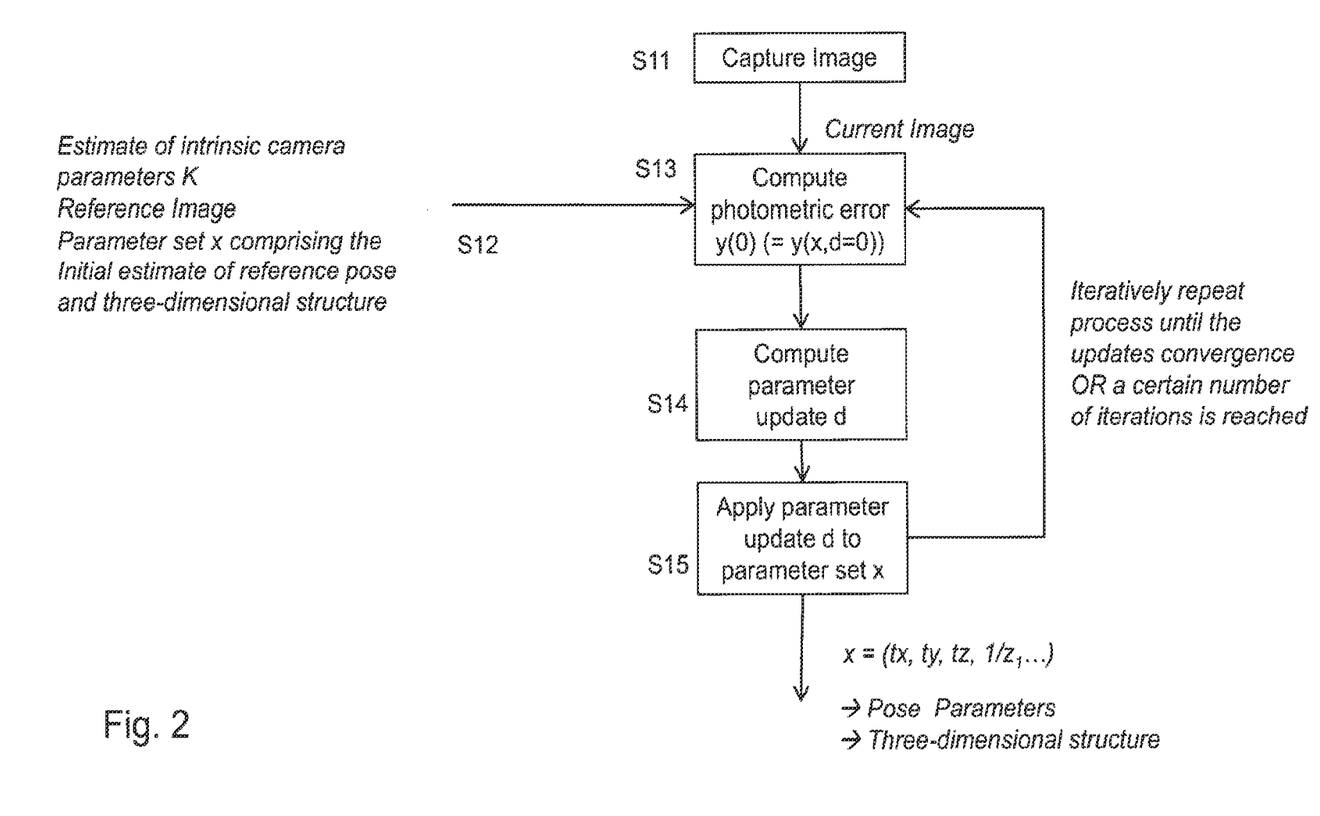
FIG. 2 shows a flow diagram of an embodiment of the invention.

In step S12 a reference image is provided including at least a part of the real object as contained in the current image, such as shown in FIG. 1b. Further, an estimate of intrinsic camera parameters K is provided as well as a parameter set x comprising an initial estimate of reference pose (i.e. the pose of the camera when capturing the reference image) and three-dimensional structure. Particularly, the initial estimate of parameter set x is including at least the three-dimensional translation in the common coordinate system between the pose of the camera when capturing the reference image I* and the pose of the camera when capturing the current image I, and the depth of at least a first point of the real object in the common coordinate system.

For example, the three-dimensional structure may include one or more points $z_i$, with $z_i$ being the depth of a point i with respect to the camera coordinate system. In this way, when having multiple points $z_i$ a mesh M may be created such as shown in FIG. 1a with $z_i$ being a respective one of the node points of the mesh. According to FIG. 1a, based on the estimated parameters x of the last frame/iteration, the mesh is placed onto the current camera image I. The triangles of the mesh as shown in the example are called faces.

Figure 1C:
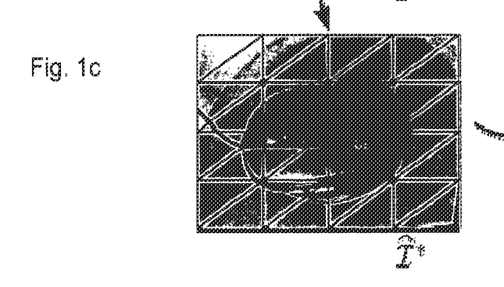
Figure 1D:
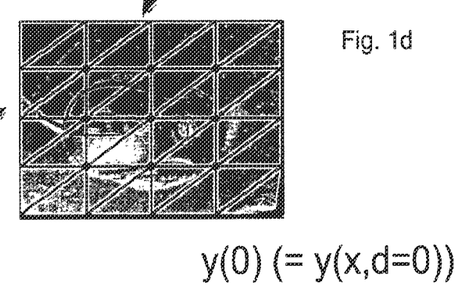

As shown in FIG. 1c, each face of the mesh is warped back into the reference frame, i.e. the coordinate system of the reference image as shown in FIG. 1b.

In step S13, a first set of pixels in the reference image I* (FIG. 1b) is compared with a computed set of pixels in the current image, the computed set of pixels being indicative of a part of image I* as shown in FIG. 1c. In the following iterative minimization process according to steps S13-S15 a first set of pixels in the reference image is compared with a computed set of pixels in the current image, wherein the computed set of pixels in the current image used for the comparison varies at each iteration. Particularly, the photometric error y is computed using the data of the current image as computed with respect to FIG. 1c and the reference image. This error is used in the cost function phi(d) of a non-linear optimization that searches for an update d of the parameters. Regularization can optionally be integrated into phi(d).

According to step S14, a parameter update d of the parameter set x is computed from the photometric error y and applied to the parameter set x in step S15. The steps S13-S15 are iteratively repeated until the updates d convergence or a certain number of iterations is reached. For example, the iterative minimization process determines the update of the estimate of the parameter set x until a certain number of iterations has been reached or the size of the updates falls below a defined threshold. The output of the iterative minimization process at step S15 is the parameter set x containing the translation values tx, ty, tz indicative of the calculated camera pose with respect to the real object and the depth of one or multiple points of the real object in the common coordinate system, from which the three-dimensional structure of the real object may be computed. In the present embodiment, for determining of the depth of one or multiple points of the real object an update of the inverse of the depth ($1/z_i$) is determined instead of an update of the depth.

According to an embodiment, the parameter set x may further include the three-dimensional rotation in the common coordinate system between the pose of the camera when capturing the reference image I* and the pose of the camera when capturing the current image I.

According to an embodiment, in the iterative minimization process the update of the depth or the inverse of the depth is constrained by a regularization, in particular by considering a physical model. For example, the update of the depth or the inverse of the depth is only determined if the three-dimensional translation exceeds a certain threshold.

The method according to the invention thus described is based on the idea of tracking the camera pose relative to a reference image I* of an object. Simultaneously, the shape of the object as seen in I* is estimated, using a triangular mesh M as model for the shape and initially assuming it to be planar. As the camera moves, the mesh deforms towards the true shape of the object. This is illustrated in FIG. 1 as mentioned above.

Figure 3:
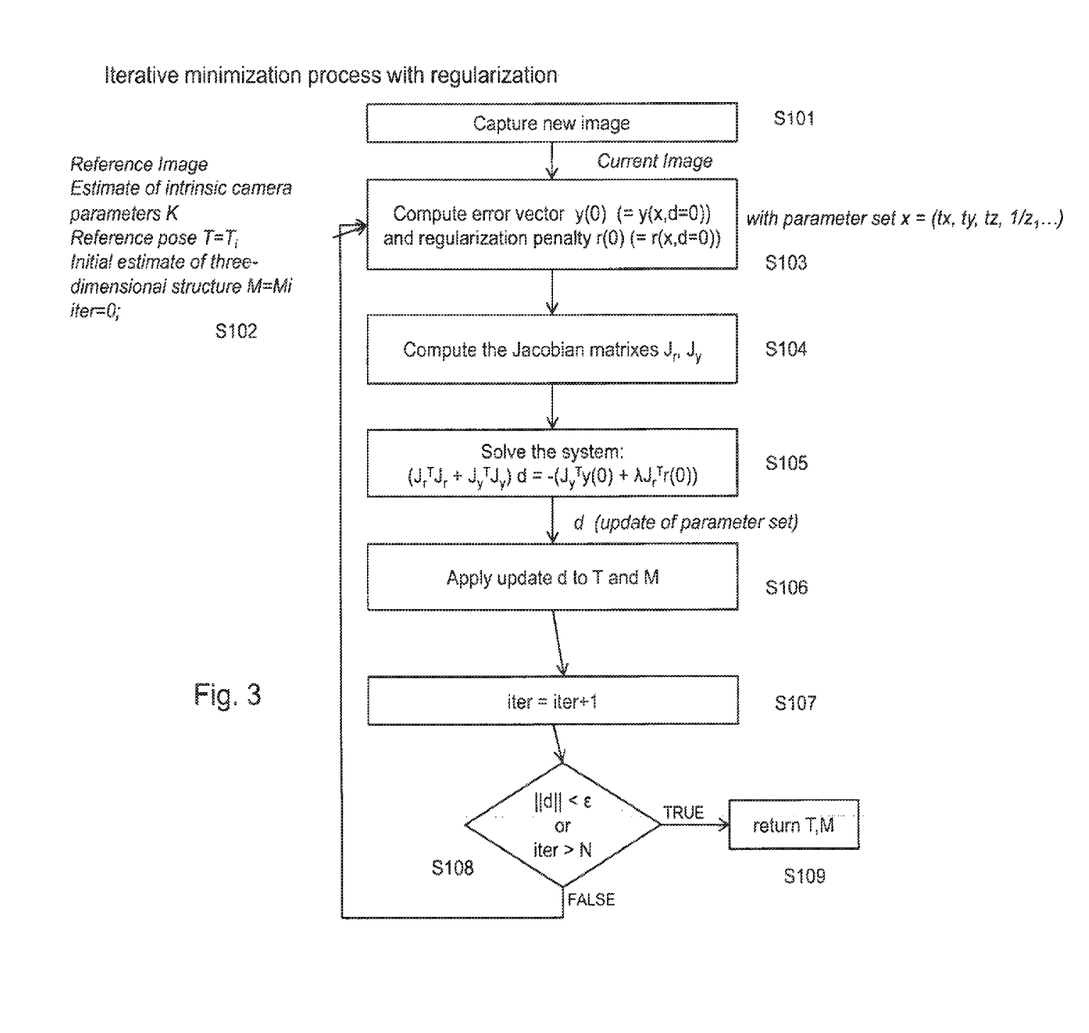
FIG. 3 shows an embodiment of an iterative minimization process with optional regularization according to an embodiment of the invention.

With reference to FIG. 3 showing steps S101 to S109, an embodiment of a method according to the invention will be explained in more detail.

The task of the algorithm is to estimate updates of the mesh M and the camera pose T in SE(3) given a novel image I of the object and priors on mesh and pose, denoted as $\tilde{M}$ and $\hat{T}$. The estimates are typically obtained by using the results of the last frame when dealing with video sequences.

We assume that, ignoring occlusion and drastic lighting changes, the reference image I* can be constructed from I by back-warping each face f given the true pose $\bar{T}$ mesh $\bar{M}$. Given that we do not know the true values of $\bar{T}$ and $\bar{M}$ and only their approximations $\hat{T}$ and $\hat{M}$ are available we can produce an estimated image $\hat{I}$* by applying homography G to each facet of the mesh.

This is illustrated in FIG. 1. As the mesh is defined piece-wise planar, warping a single face f is conducted by the homography:

$$G(T, n_f) = K(R + tn_f^T) K^{-1} G_f.$$

Here, K denotes the known 3×3 camera intrinsics, $n_f$ in $R^3$ is the normal of face f scaled by the inverse of the distance $d_f$ of the face to the camera center c* in the reference frame; the camera pose T is decomposed to get R in SO(3) and t in $R^3$. Finally, the homography $G_f$ is used to translate the mesh facet to its specified position within I*.

We assume that the updates T(d), $n_f(d)$ of the estimates $\hat{T}$, $\hat{n}_f$ are reasonably small. They are parametrized in terms of the camera pose and the mesh deformation:

$$d = (w_x, w_y, w_z, v_x, v_y, v_z, \psi_1, \psi_2, \ldots, \psi_n)$$

where the first six parameters represent the update of the pose T of the camera, currently computed via exponential maps. The remainder of d represents the update of the inverse depthes $\psi_i = 1/z_i^*$ of the movable vertices. Every vertex $v_i$ of M* is defined via its 2D coordinates $v_i = (u_i^*, v_i^*, 1)^T$ in I* and its depth $z_i^*$ w.r.t. the camera center c*.

Figure 4:
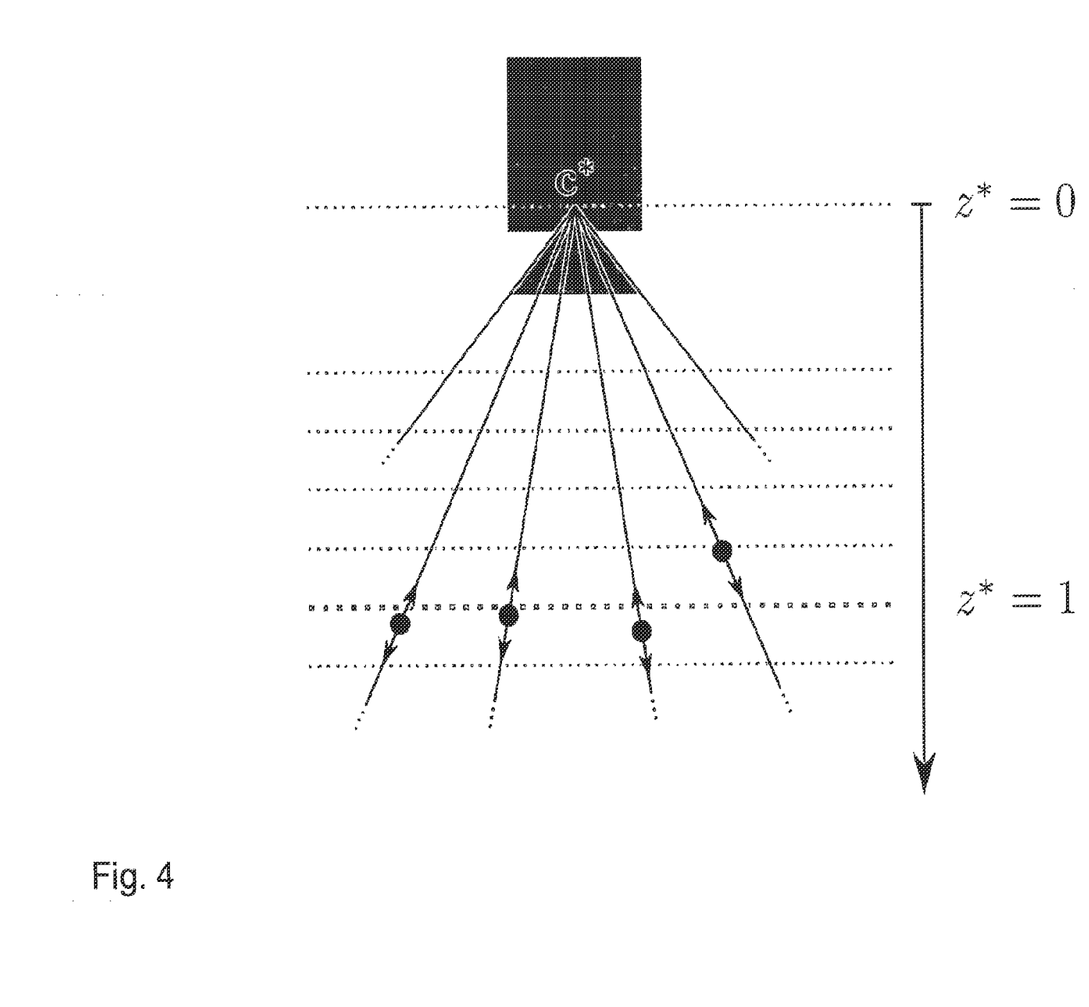
FIG. 4 shows a depiction in which the vertices of the mesh are free to move along their respective projection ray, i.e. ($u_i^*$, $v_i^*$) are fixed but $z_i$ may change.

Deformations of the mesh are modeled by moving vertices along the rays emanating from the camera center c* in the reference view, see FIG. 4.

The normal $n_f$ of a face f defined by $\{v_i, v_j, v_k\}$ is computed directly from the vertices and their according inverse depth is:

$$n_f(d) = \frac{n}{d^*} = K^T [v_i \ v_j \ v_k]^{-T} [\psi_i \ \psi_j \ \psi_k]^T$$

This formula comes from combining the inverted pinhole projection $a = (x,y,z)^T = zK^{-1}(u,v,1)^T$ with the plane equation $n^T a = d^*$ (NB: here d* denotes the distance of face f to the camera center c* in the reference frame, parameterized by the update vector d). Note that this parametrization of $n_f(d)$ is linear w.r.t the inverse of the depthes.

For the sake of simplicity, we consider a single face of the mesh only and define the error vector corresponding to the data term:

$$y(d) = (y_1(d), y_2(d), \ldots, y_m(d))^T$$

be an error measure with for all i in 1, 2, . . . . m:

$$y_i(d) = \hat{\mathcal{I}}^* - \mathcal{I}^* = \mathcal{I}(q_i) - \mathcal{I}^*(p_i^*)$$

$$q_i = w(G(\hat{T}T(d), n_f(x+d)) p_i^*)$$

where $q_i$ are pixel coordinates in the input image obtained by back-warping it to the reference image. $w((a,b,c)^T) = (a/c, b/c, 1)^T$ represent a normalization of homogeneous coordinates and m is the number of pixels $p_i^*$ of the face in $\hat{I}$*. The prior of the depths is kept in x, thus the update $n_f(x+d)$ used in the last equation above is equivalent to the update $1/\hat{z}z \leftarrow 1/\hat{z} + \psi$ (NB: As can be observed, y(d) actually depends both on d and x, i.e. current state and its update. For simplicity we omit the parameter x most of the time as we are primarily interested in computing the update d. However, for completeness, we also reference it as y(x,d) where appropriate in the figures). To increase the numerical stability of the system, a regularization term is added to the cost function via a function r(d): $R^{6+n} \rightarrow R^{6+n}$ with n movable vertices in the mesh, discussed later. The cost function can then be written as $$\phi(d) = \frac{1}{2} (\|y(d)\|^2 + \lambda \|r(d)\|^2)$$

where the scalar $\lambda$ is used to balance the squared norms of y(d) and r(d). Like in Gauss-Newton the update d is computed by linearizing the quadratic cost function and therefore solving the linear system:

$$(J_y^T J_y + \lambda J_r^T J_r) d = -(J_y^T y(0) + \lambda J_r^T r(0))$$

where $J_y$ and $J_r$ are Jacobians of the data and the regularization terms. This equation can be solved for d using standard techniques such as pseudo-inverse or Cholesky decomposition. The update d is applied and another iteration is run until either the norm of the update is below a certain threshold (we chose $10^{-3}$ in the experiments) or the maximum number of iterations is reached.

The Jacobian $J_y$ can be written as the product $$J_y = J_{\hat{I}^*} J_d J_G.$$

where $J_{\hat{I}^*}$ is the gradient of the estimated reference image, $J_d$ and $J_G$ are the Jacobians of the projection and the homography. This first order linearization can be approximated to second order by including the gradient of the reference image $J_{I^*}$ like $$J_y = \frac{J_{\hat{I}^*} + J_{I^*}}{2} J_d J_G.$$

Figure 7:
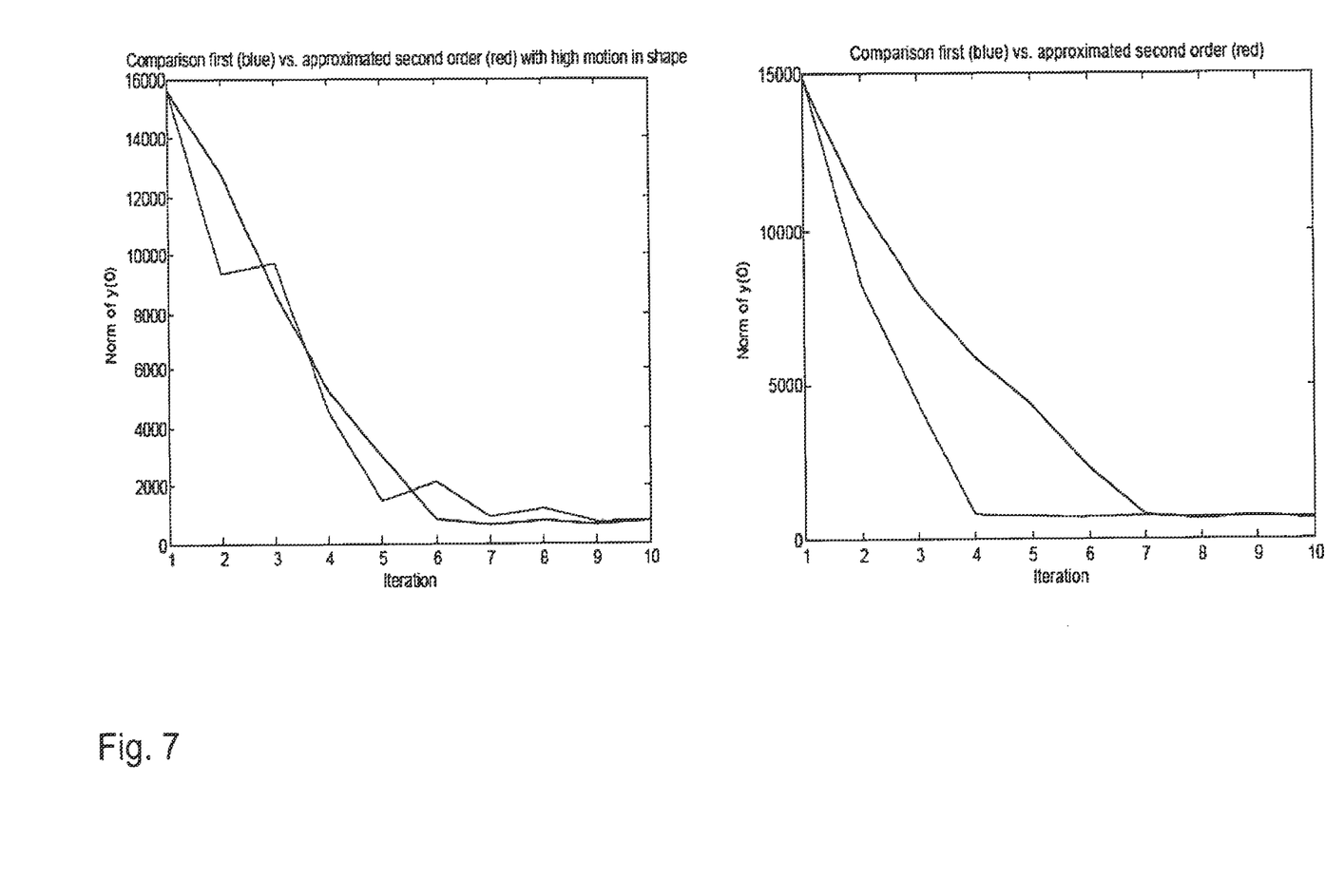
FIG. 7 shows an illustration regarding evaluation of synthetic data. Comparison of first (upper) and approximated second (lower) order linearization of Jy. In case of very high motion in the depths, they behave similarly. In other, more typical configurations 2-4 iterations can be saved.

As shown in FIG. 7, this in general increases the convergence frequency with low additional costs.

In case the camera is close to the reference camera, the matrix $J_y^T J_y$ becomes increasingly ill-conditioned, i.e. tiny changes in y(0) may provoke huge changes in d. This is due to the fact that the projection rays of the current camera are approximately aligned with those of the reference camera (depicted in FIG. 4). In this degenerate configuration, arbitrary movements of the vertices, respectively their inverse depth $\psi_i$, result in almost identical unwarped reference images $\hat{I}^*$.

However, this configuration can be easily mitigated by adding a regularization term r(d) to the cost function that restrains the inverse depthes in that case. We define r(d) as $$r(d) = (0_{1 \times 6}, r_1(d), r_2(d), \ldots, r_n(d))^T$$

which currently only operates on the n movable vertices. We compute for all i in 1, 2, ..., n:

$$r_i(d) = \left(1 + \lambda_s e^{-\lambda_r \|\hat{t}\|^2}\right)\left(\frac{1}{\hat{\psi}_i + \psi_i} - \mu_i\right).$$

The first part of the regularization term is the weighting factor that penalizes the degenerate configuration just discussed.

The scalars $\lambda_s$ and $\lambda_r$ determine the scale and range of the penalty concerning the baseline, empirically $\lambda_s = \lambda_r = 10$ gave good results.

The second part of r(d) is responsible for damping the deformations and moving them towards their most likely true value. It penalizes changes of the depthes with respect to a reference depth $\mu_i$ of the vertex.

A naïve way of determining $\mu_i$ may consist in computing it as running average, e.g. updated after every image as $\mu_i \leftarrow 0.9 * \mu_i + 0.1 \hat{\psi}_i$. This method is simple yet effective in case of a continuously moving camera. However, when the camera becomes stationary, $\mu_i$ will converge towards the value optimal for only this local configuration (which may be different from the globally optimal depth because of ambiguities). In other words, all information from previous successful registrations will be lost over time.

Therefore, our approach of computing $\mu_i$ tries to preserve previous knowledge about the camera motion. The idea is to spatially sample height estimates together with confidence values incorporating not only the height estimate of vertex i but also other estimates such as the pose of the camera or heights of adjacent vertices. It is outlined in FIG. 5 and will now be explained in detail.

We use the ray to the reference camera center c* from the initially assumed 3d point $a_i$ corresponding to vertex $v_i$ as normal for a plane $\pi_i$. On this plane, a unit square centered on $a_i$ is subdivided into a regular grid. While the user moves the camera, we cast a ray from $a_i$ to the current camera center c, intersect it with the unit half-sphere around $a_i$ and project the intersection onto $\pi_i$, as displayed on the left side of FIG. 5. The cell which contains the projection records the current height estimate of the algorithm and a similarity measure $S_i$ consisting of the sum of the NCCs between I* and $\hat{I}^*$ for all adjacent faces of vertex i. Values stored in a cell are updated when there was either no prior record or in case the stored similarity measure $S_i$ was smaller than the one currently obtained.

Figure 5:
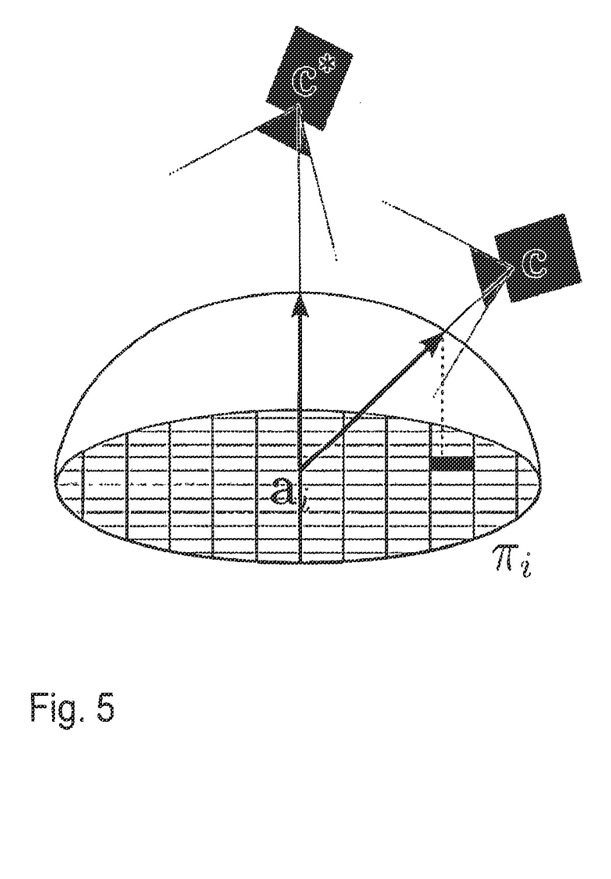
FIG. 5 shows a depiction which illustrates a computation of reference depth $\mu_i$ from all successful previous information. Left image: The highlighted cell is currently used for storing the estimate of the height and the similarity measure based on adjacent faces of the vertex. Right image: Example of cells containing data during typical run of the algorithm, with the ground track of the camera overlayed.
Figure 6:
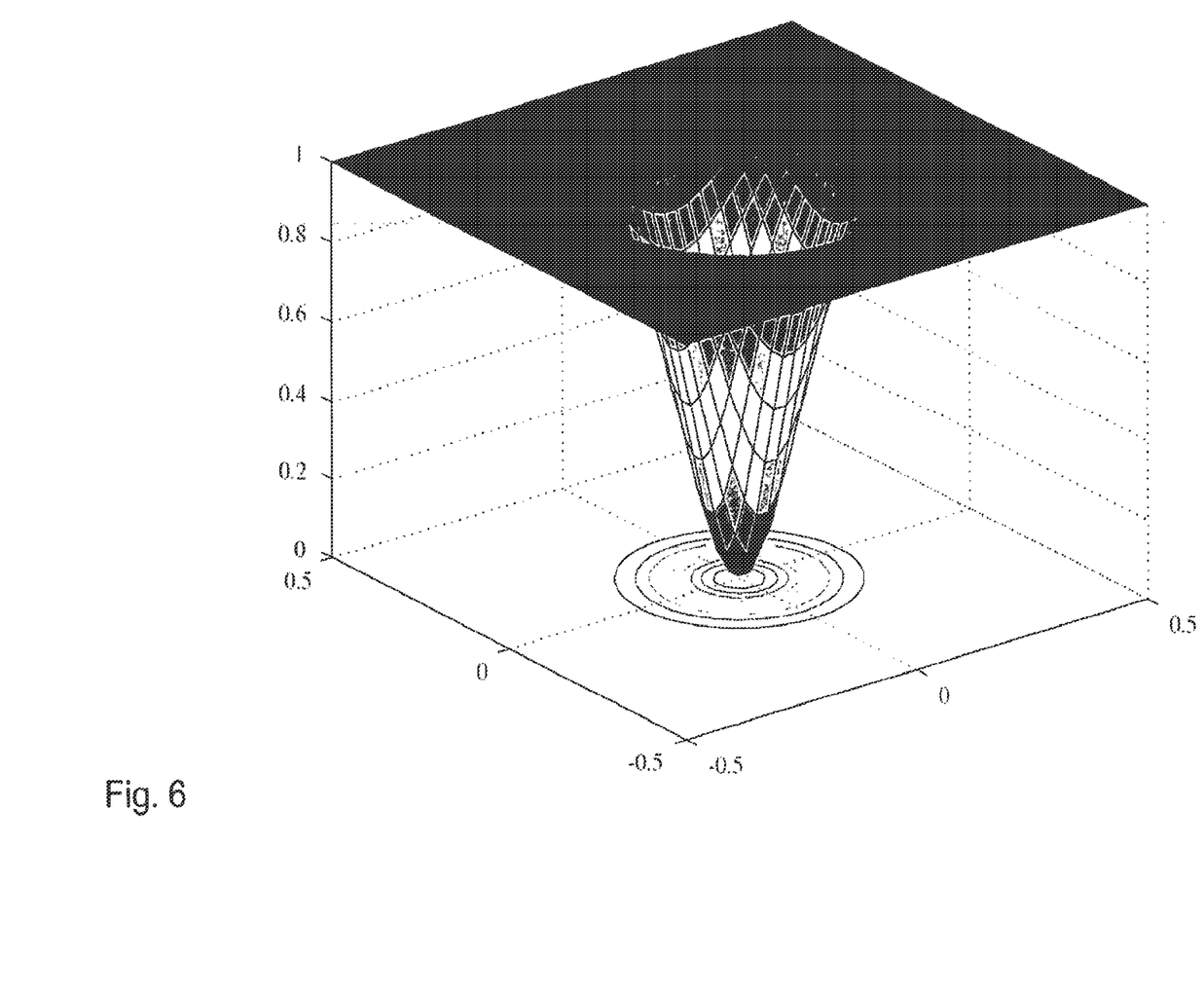
FIG. 6 shows an illustration of the weighting function used inside the computation of the reference depth, wherein that weighting function penalizes samples close to the reference position similar to the regularization term r(d) as these typically are least discriminative.

The reference height $\mu_i$ is then computed from the recorded data as $$\mu_i = \frac{\sum_p z_i(p) S_i(p) w(p, a_i)}{\sum_p S_i(p) w(p, a_i)}$$

where p represents a point inside the unit square on plane $\pi_i$, $z_i(p)$ is the corresponding recorded estimated heights, $S_i(p)$ the according summed adjacent NCCs and $w(p, a_i)$ is a function that downweights samples drawn close to $a_i$ as these are least discriminative. In our experiments, we used as weighting function $$w(p, a_i) = 1 - e^{-\lambda_w \|p - a_i\|^2}$$

with $\lambda_w = 50$, on a grid of resolution 100×100. The function is visualized in FIG. 6.

Initially, the value of $\mu_i$ changes rapidly as the shape transforms from the inital estimate towards a more likely shape. The variance of $\mu_i$ increases, but at a certain point, when the user moved sufficiently, the variance begins to steadily decrease. Hypothetically, when the user has seen the object from various viewpoints so that all cells of the unit circle are covered, $\mu_i$ becomes constant. Consequently, the estimated shape of the template becomes very close to the running average and regularization practically cancels. In practice, the outer regions of the grid are in general seldomly visited, we used the grid only for the inner 70% of the unit circle and stored the data of the outer 30% in its outmost cells to better utilize the grid.

In the following, a few details of the implementation are mentioned which further improve either result or efficiency of the method. In addition to the regularization, we improve the numerical stability of the minimization by scaling the intensity values to lie in the interval [0,1]. Furthermore, the mean of the error y(0) is subtracted from the error before using it in the optimization. This can be done with very low additional cost and increases the method's robustness against uniform lighting changes.

To compute y(0) and the gradients of $\hat{I}^*$, the faces of the mesh are warped piecewise from I to $\hat{I}^*$. This is done using the bounding box of each face and a mask telling which pixels are part of the face. The image gradients are computed using the Prewitt operator. For this, the mask of each face is grown by one pixel before warping to obtain all intensities needed for the operator. Thus only the minimal number of pixels is warped. As the regions of the grown masks in general overlap in Î*, the unwarped faces have to be stored in separate images.

In order to increase convergence radius and the speed of the algorithm, the minimization is run on several levels L of an image pyramid, starting from the smallest level. The original resolution of the camera image is located on level 0. A scale factor s defines the step between the pyramid levels. In our experiments, we used s=2. To run the minimization on level L of the pyramid, the mesh M respectively the dimensions of the bounding box of each face have to be scaled with $s^{-L}$ to warp the correct amount of pixels. There are in general two options when constructing an image pyramid—by constructing all levels based on either the previous level or the base level. We chose to use the latter approach. So, to construct Î* on level L, we warp each face from the original resolution of I using a scaled homography $GS^L$ with S=diag (s,s,1) and G as defined initially. For the correct derivation of $J_y$ we have to use $S^{-L}GS^L$ inside y(d) as it needs to operate on equal pyramid levels for both I* and Î*.

While the invention has been described with reference to exemplary embodiments, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims.

What is claimed is:

1. A method comprising:
   capturing an image that includes at least one real object;
   generating a parameter set estimate, wherein the parameter set estimate includes information relating to a comparison of an estimated pose of a camera when capturing a captured image and a pose of a second camera when capturing a reference image;
   determining an update of the parameter set estimate by an iterative minimization process, wherein the iterative minimization process includes:
      comparing a first set of pixels in the reference image with a computed set of pixels in the captured image, wherein the computed set of pixels used for comparison varies in different iterations of the iterative minimization process; and
   using the update of the parameter set estimate to determine at least one of a pose of the camera that captured the image with respect to the real object and a three-dimensional structure of the at least one real object.

2. The method of claim 1, wherein the reference image includes at least a part of the at least one real object.

3. The method of claim 2, wherein the information relating to the comparison of an estimated pose of a camera when capturing a captured image and a pose of a second camera when capturing a reference image includes a three-dimensional translation in a common coordinate system between the second camera pose when capturing the reference image and the camera pose when capturing the captured image.

4. The method of claim 3, wherein the parameter set estimate includes a depth of a first point, on the at least one real object, in the common coordinate system.

5. The method of claim 4, wherein the update of the parameter set includes an update of the depth of the first point of the at least one real object, and wherein determining the update of the depth of the first point of the at least one real object comprises determining an inverse of the depth of the first point of the at least one real object.

6. The method of claim 3, wherein the pose of the second camera when capturing the reference image is acquired using at least one of structured light, optical feature tracking, inertial sensor information, and stereovision.

7. The method of claim 1, wherein the parameter set estimate includes one or more of:
   (i) a three-dimensional rotation in a common coordinate system between the pose of the second camera when capturing the reference image and the pose of the camera when capturing the captured image;
   (ii) vertical and horizontal focal lengths of at least one camera; and
   (iii) coordinates of a principal point of at least one camera.

8. The method of claim 1, wherein the iterative minimization process comprises determining the update of the estimate of the parameter set until a certain number of iterations has been reached or a size of the updates falls below a defined threshold.

9. One or more non-transitory program storage devices, readable by a processor and comprising instructions stored thereon to cause one or more processors to:
   receive a captured image that includes at least one real object;
   generate a parameter set estimate, wherein the parameter set estimate comprises information relating to a comparison of an estimated pose of a camera when capturing a captured image and a pose of a second camera when capturing a reference image,
   determine an update of the parameter set estimate by an iterative minimization process, wherein the iterative minimization process includes:
      comparing a first set of pixels in the reference image with a computed set of pixels in the captured image, wherein the computed set of pixels used for comparison varies in different iterations of the iterative minimization process; and
   use the update of the parameter set estimate to determine at least one of a pose of the camera that captured the image with respect to the real object and a three-dimensional structure of the at least one real object.

10. The one or more non-transitory program storage devices of claim 9, wherein the reference image includes at least a part of the at least one real object.

11. The one or more non-transitory program storage devices of claim 10, wherein the information relating to the comparison of an estimated pose of a camera when capturing a captured image and a pose of a second camera when capturing a reference image includes a three-dimensional translation in a common coordinate system between the second camera pose when capturing the reference image and the camera pose when capturing the captured image.

12. The one or more non-transitory program storage devices of claim 11, wherein the parameter set estimate further includes a depth of a first point, on the at least one real object, in the common coordinate system.

13. The one or more non-transitory program storage devices of claim 12, wherein the update of the parameter set includes an update of the depth of the first point of the at least one real object, and wherein determining the update of the depth of the first point of the at least one real object comprises determining an inverse of the depth of the first point of the at least one real object.

14. The one or more non-transitory program storage devices of claim 11, wherein the parameter set includes one or more of:

(i) a three-dimensional rotation in a common coordinate system between the pose of the second camera when capturing the reference image and the pose of the camera when capturing the captured image;
(ii) vertical and horizontal focal lengths of at least one camera; and
(iii) coordinates of a principal point of at least one camera.

15. The one or more non-transitory program storage devices of claim 11, wherein the pose of the second camera when capturing the reference image is acquired using at least one of structured light, optical feature tracking, inertial sensor information, and stereovision.

16. The one or more non-transitory program storage devices of claim 9, wherein the iterative minimization process comprises determining the update of the estimate of the parameter set until a certain number of iterations has been reached or a size of the updates falls below a defined threshold.

17. One or more non-transitory program storage devices, readable by a processor and comprising instructions stored thereon to cause one or more processors to:
receive a captured image that includes at least one real object;
generate a parameter set estimate, wherein the parameter set estimate includes (i) information relating to a comparison of an estimated pose of a camera when capturing a captured image and a pose of a second camera when capturing a reference image, and (ii) a depth of a first point on the at least one real object, and wherein the reference image includes at least a part of the at least one real object;
determine an update of the parameter set estimate by an iterative minimization process, wherein the iterative minimization process includes:
comparing a first set of pixels in the reference image with a computed set of pixels in the captured image, wherein the computed set of pixels used for comparison varies in different iterations of the iterative minimization process; and
use the update of the parameter set estimate to determine at least one of, a pose of the camera that captured the image with respect to the real object and a three-dimensional structure of the at least one real object.

18. The one or more non-transitory program storage devices of claim 17, wherein the parameter set estimate includes a three-dimensional translation in a common coordinate system between the second camera pose when capturing the reference image and the camera pose when capturing the captured image.

19. The one or more non-transitory program storage devices of claim 17, wherein the parameter set includes one or more of:
(i) a three-dimensional rotation in a common coordinate system between the pose of the second camera when capturing the reference image and the pose of the camera when capturing the captured image;
(ii) vertical and horizontal focal lengths of at least one camera; and
(iii) coordinates of a principal point of at least one camera.

20. The one or more non-transitory program storage devices of claim 18, wherein the pose of the second camera when capturing the reference image is acquired using at least one of structured light, optical feature tracking, inertial sensor information, and stereovision.

* * * * *